United States Patent
Zhang

(10) Patent No.: US 8,108,355 B2
(45) Date of Patent: Jan. 31, 2012

(54) PROVIDING A PARTIALLY SORTED INDEX

(75) Inventor: Bin Zhang, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 959 days.

(21) Appl. No.: 11/588,617

(22) Filed: Oct. 27, 2006

(65) Prior Publication Data

US 2008/0104102 A1    May 1, 2008

(51) Int. Cl.
  *G06F 17/00* (2006.01)
  *G06F 7/00* (2006.01)
(52) U.S. Cl. ........ 707/673; 707/696; 707/711; 707/715; 707/741
(58) Field of Classification Search .................. 707/1–7, 707/100–103, 999.1, 999.001, 696, 711, 707/715, 741–746, 830
See application file for complete search history.

(56) References Cited

U.S. PATENT DOCUMENTS

| | | | |
|---|---|---|---|
| 5,204,958 A * | 4/1993 | Cheng et al. ................... | 707/102 |
| 5,440,732 A * | 8/1995 | Lomet et al. ....................... | 707/1 |
| 5,799,184 A * | 8/1998 | Fulton et al. ....................... | 707/2 |
| 6,026,406 A | 2/2000 | Huang et al. | |
| 6,105,025 A * | 8/2000 | Jacobs et al. ........................... | 1/1 |
| 6,282,605 B1 * | 8/2001 | Moore .......................... | 711/103 |
| 7,028,022 B1 * | 4/2006 | Lightstone et al. ............... | 707/2 |
| 7,099,864 B2 * | 8/2006 | Finlay et al. ....................... | 707/7 |
| 7,734,618 B2 * | 6/2010 | Kleewein et al. ............. | 707/715 |
| 2003/0204513 A1 * | 10/2003 | Bumbulis ...................... | 707/100 |
| 2004/0024738 A1 | 2/2004 | Yamane | |
| 2004/0133590 A1 * | 7/2004 | Henderson et al. ........... | 707/102 |
| 2005/0203940 A1 * | 9/2005 | Farrar et al. ................... | 707/102 |
| 2006/0026116 A1 * | 2/2006 | Day et al. .......................... | 707/1 |

OTHER PUBLICATIONS

A. Guttman, "R-Trees A Dynamic Index Structure for Spatial Searching," pp. 47-57 (1984).
M.H. Nodine et al., "Optimal Deterministic Sorting on Parallel Disks," pp. 1-22 (Mar. 20, 2001).

* cited by examiner

*Primary Examiner* — Yicun Wu
*Assistant Examiner* — Yu Zhao

(57) ABSTRACT

To provide an index for a table in a database system, the index is partially sorted in an initial phase of building the index. Subsequently, in response to accessing portions of the index to process a database query, further sorting of the accessed portions of the index is performed.

18 Claims, 3 Drawing Sheets

PROVIDING A PARTIALLY SORTED INDEX

BACKGROUND

Data is often collected and stored in databases. Access to a database is managed by a database management system, such as a relational database management system (DBMS or RDBMS). To retrieve or update data in a database, database queries, such as Structured Query Language (SQL) queries, are submitted to the database management system.

A database typically includes multiple tables, where each table contains data arranged in rows and columns. In large databases, tables can be relatively large in size. To allow more efficient access of tables within the database, indices are typically maintained for the tables in the database. An index is a data structure that contains an arrangement of data values of one or more attributes (referred to as a key) which are arranged in some sorted order (e.g., ascending sorted order or descending sorted order). In response to a query to access a table on which an index is maintained, database software can access the index to quickly find the locations within the table that contain the requested data. There are various types of indices, including B-tree indices, hash indices, and others. B-tree indices are the most widely used in database management systems.

Building an index for large databases can be a relatively time-consuming process, especially for databases containing terabytes or other large amounts of data. As indices are being built, the tables that are involved are locked such that users do not have access to such locked tables. The relatively large amount of time that a database table may be unavailable for use during index building can reduce the performance of the database system.

BRIEF DESCRIPTION OF THE DRAWINGS

Some embodiments of the invention are described with respect to the following figures.

DETAILED DESCRIPTION

Figure 1:
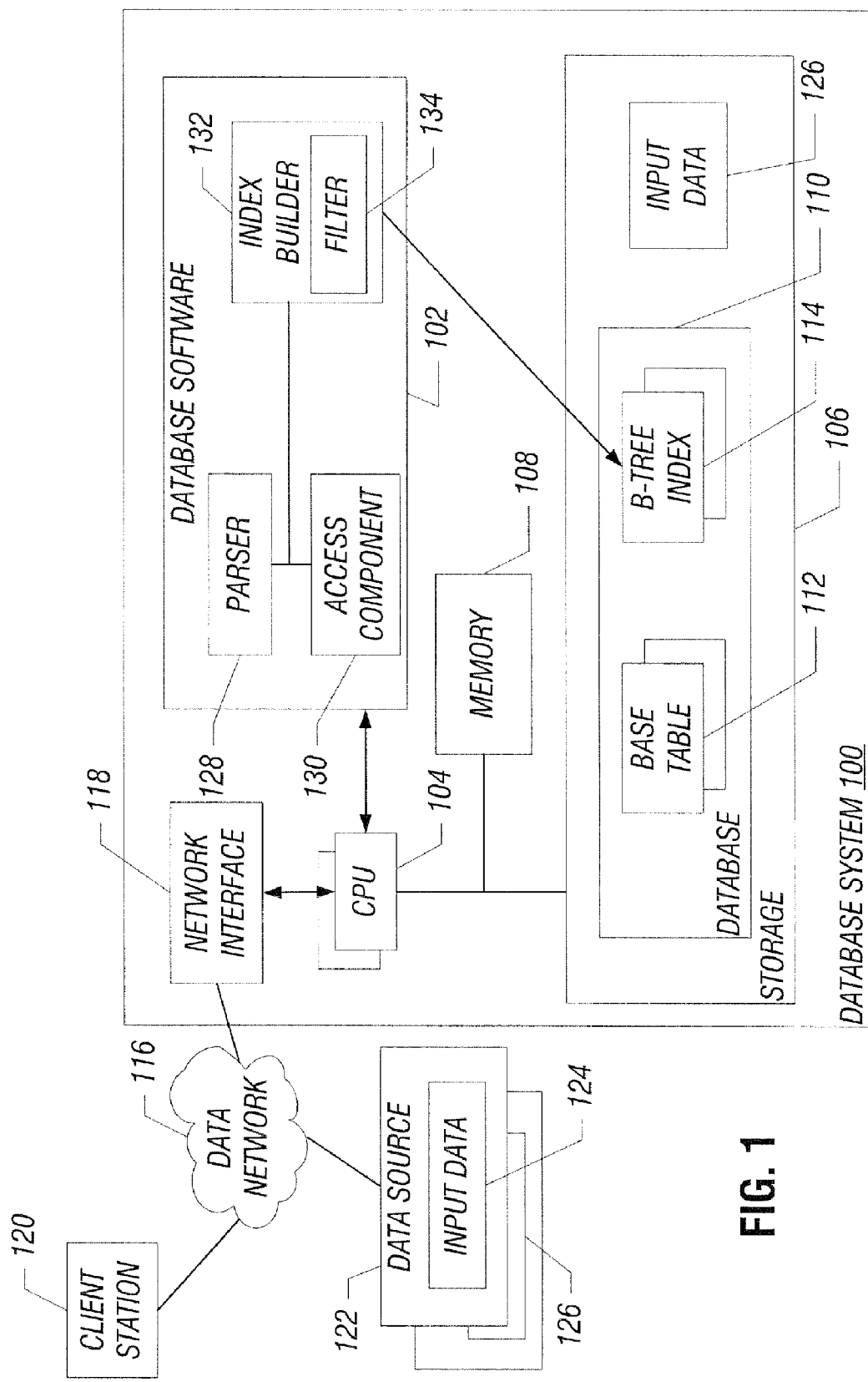
FIG. 1 is a block diagram of an example arrangement that includes a database system containing an index-building mechanism according to some embodiments.

In accordance with some embodiments, during initial building of a B-tree index, a semi-sorted (or partially-sorted) B-tree index is built (referred to as an ss-B-tree). A "semi-sorted" or "partially-sorted" (the two terms are used interchangeably) index is an index where some local portions of the index are sorted, but the entire index is not fully sorted. A B-tree index, which is a very widely used index in database management systems, generally refers to any one of multiple variants of the B-tree index, including the B$^+$-tree index. A B-tree index is a type of tree indexing structure that includes a set of linked nodes. Inner nodes (non-leaf nodes) of a B-tree index can have a varying number of child nodes. The highest level node in the B-tree index is its root, which points to children nodes, which in turn may point to more children nodes depending on the depth of the tree. The lowest level nodes have no children, and these nodes are referred to as "leaf nodes." Each leaf node of a B-tree holds one or multiple entries (up to some specified maximum number). Each entry in the leaf node is of the following format: (key value, a list of row identifiers). Each row identifier points to a row of a base table on which the B-tree index is maintained and the indexed attribute(s) of the row have the corresponding key value. In accordance with some embodiments, as discussed further below, each leaf node is also associated with a range of key values to indicate the possible range of key values contained in the leaf node.

In an ss-B-tree index, each leaf node is locally sorted, although nearby leaf nodes may overlap. However, leaf nodes that are far away from each other are fully sorted.

Although reference is made to B-tree indices, it is noted that in other embodiments, techniques according to some embodiments can be applied to other types of indices, including hash indices, and so forth. More generally, reference is made to a semi-sorted index.

The semi-sorted index can be built in a single pass through input data, which is much less costly in terms of input/output (I/O) cycles when compared to having to build a fully sorted index. The single pass through the input data can be performed when loading data from a source to a database of the database system, for example.

After the semi-sorted index is built during initial building of the index, further sorting of the index can be subsequently performed during actual use of the index (during database operations). Actual use of the index refers to accessing the index in response to database queries, such as Structured Query Language (SQL) queries, submitted by users or applications to retrieve or modify (insert, delete, update) data contained in a base table that corresponds to the index. A "base table" refers to a table that contains the actual data that is stored by the database system. An index is defined on a base table.

A subsequent further update of the semi-sorted index is an incremental update that converts some segment of the semi-sorted index into a corresponding fully-sorted segment. A segment includes two or more portions that are referred to as "blocks" (discussed below). Effectively, fully sorting segments of the index is not performed until demand (in the form of received queries) calls for full sorting of such segments. In this manner, the semi-sorted index can initially be built relatively quickly, followed by relatively small incremental sorting of corresponding segments of the index in response to demand for such segments. The semi-sorted index can be made available for use more quickly to improve database system performance when processing queries involving a base table in which the semi-sorted index is defined.

The incremental sorting of segments of the semi-sorted index is performed as part of a merge-sort phase, where the merge-sort phase is divided into a relatively large number of small, independent transactions. The reason that the incremental sorting of segments of the semi-sorted index is referred to as being part of a "merge-sort" phase is that overlapping portions of the index are merged. In a fully-sorted index, there will not be any overlapping portions of the index. However, in a semi-sorted index, there will be some overlapping portions, where "overlapping portions" refers to portions containing key values that are out of order with respect to each other. For example, assume a first portion of the index contains a first group of key values and a second portion of the index contains a second group of key values. The first and second portions overlap if at least one of the first and second portions contains a key value that should be in the other of the first and second portions if such first and second portions were fully sorted with respect to each other.

A "key value" refers to the value of a key (which includes one or more attributes) on which the index is defined. For example, a base table can have several columns (which are referred to as attributes). One or more of the columns (or attributes) of the base table can be selected for defining an index associated with the base table. In one specific example, assume a base table is maintained on employees of a company. The base table can include a social security number column in which the social security numbers of employees are maintained (other columns of this table can include a salary column, a department column, and so forth). The social security number column (or attribute) can be selected for defining an index, where the index is an index of the social security numbers (the key values) sorted in some order (ascending order or descending order) with corresponding location identifiers (that identify locations in the base table containing the attribute having the key value). In response to a query that specifies retrieval of a specific record (or records) associated with corresponding social security number(s), the index can be accessed to quickly find the location in the base table that contains the specified social security number(s).

In an ss-B-tree index, the overlapping portions correspond to overlapping nodes of the ss-B-tree index. The nodes of an ss-B-tree index overlap if the key ranges (ranges of key values) associated with the corresponding nodes overlap. The order in which overlapping nodes are merged can be triggered by actual usage of the data. Nodes that are never accessed will not go through the merging phase to save computing resources.

By using the incremental updates in the merge-sort phase, each relatively small merge transaction can be completed relatively quickly (such as in a matter of seconds), so that any lock placed on the ss-B-tree index would only lock up the small portion of the ss-B-tree index for a relatively short amount of time. The short locks on small portions of the ss-B-tree index improve availability of data and responsiveness of the database system. A fully-sorted portion of the ss-B-tree index can be immediately unlocked.

Each small merge transaction utilizes a relatively small amount of temporary storage (e.g., primary memory). Usually, the merge transaction (of overlapping portions of the index) can be performed entirely in memory without saving temporary results to persistent storage. This allows the merge-sort phase to be very efficient. Moreover, different portions of the ss-B-tree index can be merged in any order and in parallel to improve throughput in sorting of the ss-B-tree index. In a parallel database system (such as a massively parallel database system having a relatively large number of computers or processors), parallel sorting (e.g., unsynchronized parallel sorting) of different segments of the ss-B-tree index improves the speed of completing incremental sorting of respective portions of the ss-B-tree index. Additionally, whenever a bulk insert is performed into an ss-B-tree index (where a bulk insert refers to an insert of a large number of records into the index due to a large insert into the underlying base table), the bulk insert itself can be broken down into multiple independent transactions, where the data can be first inserted as semi-sorted, overlapping nodes, with such nodes merged with previous data based on usage.

A B-tree index created using a conventional merge-sort operation involves many repeated reads and sorting of data followed by merging of sorted data. The merge-sort operation is repeated until a fully sorted B-tree index is produced, during which the B-tree is locked and unavailable for use. Creating such a B-tree index has a non-linear cost, as expressed below:

$$O\left(\frac{M}{DB} * \frac{\log(N/B)}{\log(M/B)}\right) \quad \text{(Eq. 1)}$$

where
  N—number of records in the file
  M—maximum number of records that fits into the memory ($<<N$)
  B—number of records per block ($<<A$)
  D—number of blocks transferred per I/O cycle.

As an example, N can be in hundreds of millions, M can be in hundreds of thousands to millions, and B is in hundreds. For such large data sets, creating the fully-sorted B-tree index takes a relatively long time (on the order of time proportional to Eq. 1 above), and involves many I/O cycles.

In contrast, the ss-B-tree index according to some embodiments can be built more quickly. In fact, according to some embodiments, the semi-sorted index can be initially created in one pass through the input data set. In fact, in scenarios where the input data set has to be read anyway for loading into a base table, the one pass through the input data set can serve both the purpose of loading the base table and building the index, which further enhances efficiency.

Generally, an ss-B-tree allows overlapping of ranges in both the inner (non-leaf) nodes and in the leaf nodes. Sorting of the inner nodes, especially the inner nodes that are at a higher level (closer to the root node), can be performed in a relatively cost-efficient manner, since there is not a large number of such inner nodes. In some embodiments, the initially-built, ss-B-tree index can be specified to have non-overlapping inner nodes, allowing just the leaf nodes to be overlapping. In other implementations, both inner nodes and leaf nodes can be overlapping.

FIG. 1 illustrates a database system 100 that has database software 102 executable on one or more central processing units (CPUs) 104. A "database system" refers to any system (which can be implemented in one or plural computers) that manages access of data stored in a database. A "database" refers to any repository or collection of data. The database system 100 can have a centralized architecture (in which a single node is used to implement the database system) or a distributed architecture (in which the database system is distributed across multiple nodes that execute in parallel).

The CPU(s) 104 is (are) connected to a storage 106, which can be persistent storage implemented with disk-based storage devices (e.g., magnetic or optical disk-based storage devices) or other types of storage devices. The CPU(s) 104 is (are) also connected to memory 108, which can be volatile memory (also referred to as "temporary storage") implemented with higher-speed storage devices (with access speed higher than that of the persistent storage 106), such as dynamic random access memories (DRAMs), static random access memories (SRAMs), and so forth. The memory 108 can also store at least a portion of software when the software is executed.

The persistent storage 106 stores a database 110 that has one or more base tables 112 and corresponding one or more indices 114, which in the example of FIG. 1 are ss-B-tree indices. In a parallel database system where the database software 102 is divided into multiple database software modules, and the storage 106 is divided into multiple storage modules, each base table 112 and corresponding ss-B-tree index 114 can be distributed across the storage modules. Techniques according to some embodiments can be applied to such a parallel database system to allow concurrent sorting of corresponding segments of the ss-B-tree index by respective database software modules.

The content of the tables 112 can be accessed by submitting database queries, such as SQL queries, to the database software 102. The database software 102 accesses the base tables 112 in response to received database queries, where the access can be a read access (to retrieve data) and/or a write access (to update, delete, or insert data).

The database system 100 is connected to a network 116 through a network interface 118, where the network 116 can include a local area network (LAN), a wide area network (WAN), the Internet, and so forth. The network 116 is further connected to one or more client stations 120, through which users can submit queries to the database system 100. Also connected to the network 116 are one or more data sources 122, which contain input data 124 in the form of records for insertion into one or more of the base tables 112. FIG. 1 also shows that input data 126 can be stored in the storage 106.

The database software includes a parser 128 for parsing queries received by the database software 102. The database software 102 also includes an access component (or components) 130 to allow for access of the database 110. In addition, the database software 102 includes an index builder 132 according to some embodiments. The index builder 132 is used for building the ss-B-tree indices 114. The index builder 132 includes a filter 134 that is used for initially producing the ss-B-tree index according to some embodiments. The index builder 132 also performs subsequent incremental sorting of portions of each ss-B-tree index.

Each record of the input data (124 or 126) (for insertion into a corresponding row of a table) can be made up of a key and a reference. The key is a value of one or more attributes (columns) of a record in the base table 112 to be indexed. The reference is the location of a disk page (or other data block in the storage 106) that contains the record. The input data is a stream of such records: $(k_1,r_1), (k_2,r_2) \ldots (k_N,r_N)$, where N represents the number of records in the input data file (and ultimately the base table in which the records are inserted assuming that the base table initially has zero records).

Figure 2:
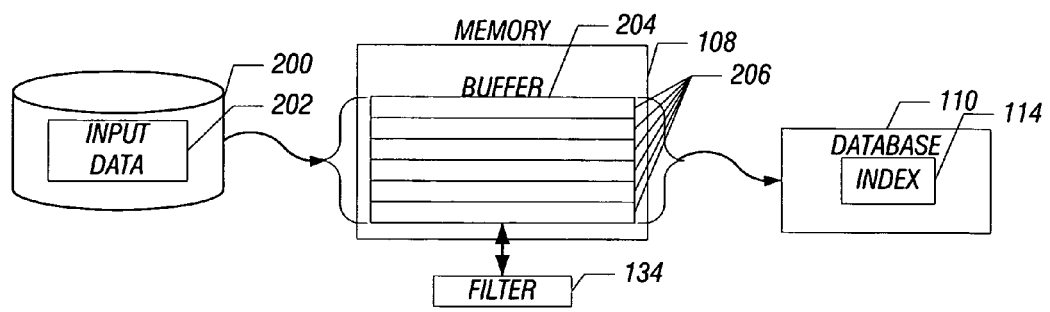
FIG. 2 illustrates processing of input data to form a semi-sorted index in accordance with an embodiment.

As depicted in FIG. 2, the input data 202 (which can be either input data 124 or 126 in FIG. 1) is initially stored in a source storage 200 (which can be a data source 122 or the storage 106 in FIG. 1). The input records of the input data 202 are fed into a buffer 204 in the memory 108, where the memory buffer 204 is allocated for producing an ss-B-tree index according to some embodiments. The memory buffer 204 is accessible by the filter 134 in the index builder 132. The memory buffer 204 has size M, which represents the maximum number of records that fits into the buffer 204. In some embodiments, the value of M is much smaller than the value of N, which is the number of records in the input data file (202).

The initially sorted portions of the ss-B-tree index are referred to as sorted "blocks," where a sorted block is a sequence of records in increasing (or decreasing) order of the key. Moreover, two special values are associated with each block: minimum of the keys and maximum of the keys in the block. In some implementations, each block contains B records, with the content of block i ($b_i$) including:

$$b_i = [(k_{i_1}, r_{i_1}), (k_{i_2}, r_{i_2}), \ldots (k_{i_B}, r_{i_B})]$$

$$\min\{b_i\} = k_{i_1} \text{ and } \max\{b_i\} = k_{i_B}.$$

The representation ($\min\{b_i\}$, $\max\{b_i\}$) indicates the key range of a block $b_i$. A key k is said to be in the range of the block, or covered by the block, if $\min\{b_i\} \leq k \leq \max\{b_i\}$. Although a key k may be covered by a particular block, it is noted that this does not necessarily imply that key k is actually contained as an item in the particular block b, since the key k can actually be contained in another block that also covers the key k. In the presence of overlapping blocks, a key k can be in one of multiple overlapping blocks that cover the key k.

Figure 3:
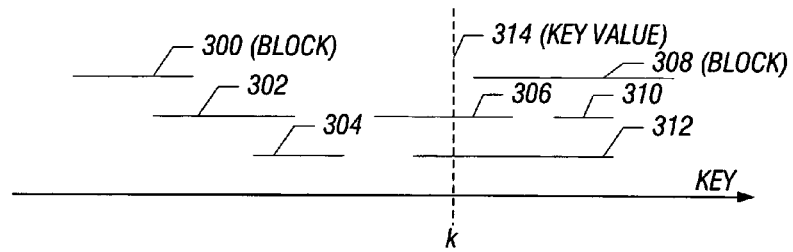
FIG. 3 is a graph to illustrate overlapping blocks in a semi-sorted index built according to an embodiment.

Overlapping blocks are illustrated in FIG. 3, where the horizontal axis represents different key values, and the horizontal line segments 300, 302, 304, 306, 308, 310, and 312 represent the key ranges of corresponding blocks. Although the ranges of respective blocks can vary, it is noted that the number of records contained in the blocks are the same, according to some implementations. In the example of FIG. 1, a vertical dashed line 314 corresponding to key value k is covered by two blocks (306 and 312). Thus, in this example, the key value k can be contained in one of block 306 and block 312. As further depicted in FIG. 3, blocks 308, 310, and 312 also overlap each other, as do blocks 300 and 302, and blocks 302 and 304. Block 306 also overlaps block 308.

A characteristic that affects the performance of the ss-B-tree index is a "thickness" characteristic, where the thickness of a sequence of blocks at key value k is defined to be the number of blocks that cover k. In other words, the thickness is the number of blocks that have to be examined to find a particular key value k. In the example of FIG. 3, the thickness at key value k is 2, since two blocks, 306 and 312, have to be examined to find the key value k. For purposes of indexing, the smaller the thickness, the more efficient the index is at k (since a smaller number of blocks have to be retrieved and examined). If thickness is 1 at all keys, a fully sorted sequence of the records can be produced by rearranging the order of the blocks (without breaking any of the blocks), to produce a fully sorted (ss-)B-tree index (even when it becomes fully sorted, it is still an ss-B-tree because it allows newly inserted data to be partially sorted, which is not allowed by a conventional B-tree). To improve the performance of the ss-B-tree index during a search, it is desirable to reduce the thickness at all key values.

One technique of controlling the thickness is to produce "tight" blocks, where a tight block is a block with a relatively small range. Tight blocks are less likely to overlap other tight blocks, since the range of each block is relatively small. However, defining the tightness of the blocks is dependent upon distribution of key values, since the range of a block can be considered tight in a low-density region but not as tight in a high-density region. Also, the tightness of blocks is also dependent upon the amount of memory available. To effectively use memory, the tightness is related to the local (in time) distribution of key values in the sequence.

There are a number of objectives that can be used in an algorithm for producing the ss-B-tree index, where such objectives include: (1) minimizing the maximum thickness of each block; (2) minimizing the average thickness of each block; or (3) minimizing a weighted average thickness of each block. The weighted average thickness uses weighting based on distribution of querying frequency. In other words, for records that are queried more often, a smaller thickness is preferred to reduce I/O costs and the amount of data that has to be cached in memory when serving the query.

To achieve tighter blocks, a distribution F(k) of key values in the input data records is derived. In one example implementation, the distribution F(k) can be based on sampling of the input data, where sampling refers to reading some number of samples (less than the entirety of the input records) to estimate the characteristic (in this case, the distribution of the key values). Sampling is a relatively easy technique of estimating characteristics of the entire data set. The sample size will influence the accuracy.

Using the distribution F(k) based on the samples, a sequence $a_1, a_2, \ldots a_K$ is chosen to partition the whole range of the key values into K bins $[a_k, a_{k+1})$, k=1, 2 . . . K–1. In FIG. 2, each of the K bins is labeled as 206. The $a_i$ values represent endpoints of each bin, which endpoints are computed based on the distribution F(k). The last bin $[a_{K-1}, a_K]$ has its right boundary closed, which means that the right endpoint is included in the interval. For each of the other bins $[a_k, a_{k+1}]$, only the left endpoint is included, not the right endpoint. The values of $a_i$, i=1, 2, . . . K–1, are derived based on the distribution F(k), with the $a_i$ values adjusted to define larger bins in regions of denser key values (so that the larger bins can hold more records in memory to enhance the likelihood of producing a larger number of non-overlapping blocks). Also, the values of $a_i$, i=1, 2, . . . K–1, can be chosen to equalize the average thickness of the blocks in all bins.

Weighting can be introduced if a query access pattern is known. For example, the query access pattern for a particular base table may be known based on historical information. A database administrator may know, based on historical information, that a base table storing employee information, for example, is subject to certain types of queries having certain patterns. If the known query access pattern indicates that certain blocks are accessed more often than other blocks, the bins corresponding to the more frequently accessed blocks can be made larger by using weighting. However, the following describes a process in the simple case that uses weighting equal to 1.

The value of B (number of records per block) is selected such that $B < \sqrt{M}$ (M is the maximum number of records in the memory buffer 204) and K=M/B (K is the number of bins in the memory buffer 204). On average, based on the foregoing, there are B records in each bin. In one example, with a record size less than 1 KB, and M in millions, the value of B can be selected to be in hundreds. Note that as the input data records are input into the memory buffer 204, some bins can have greater than B records, while other bins will have fewer than B records.

Figures 5, 6:
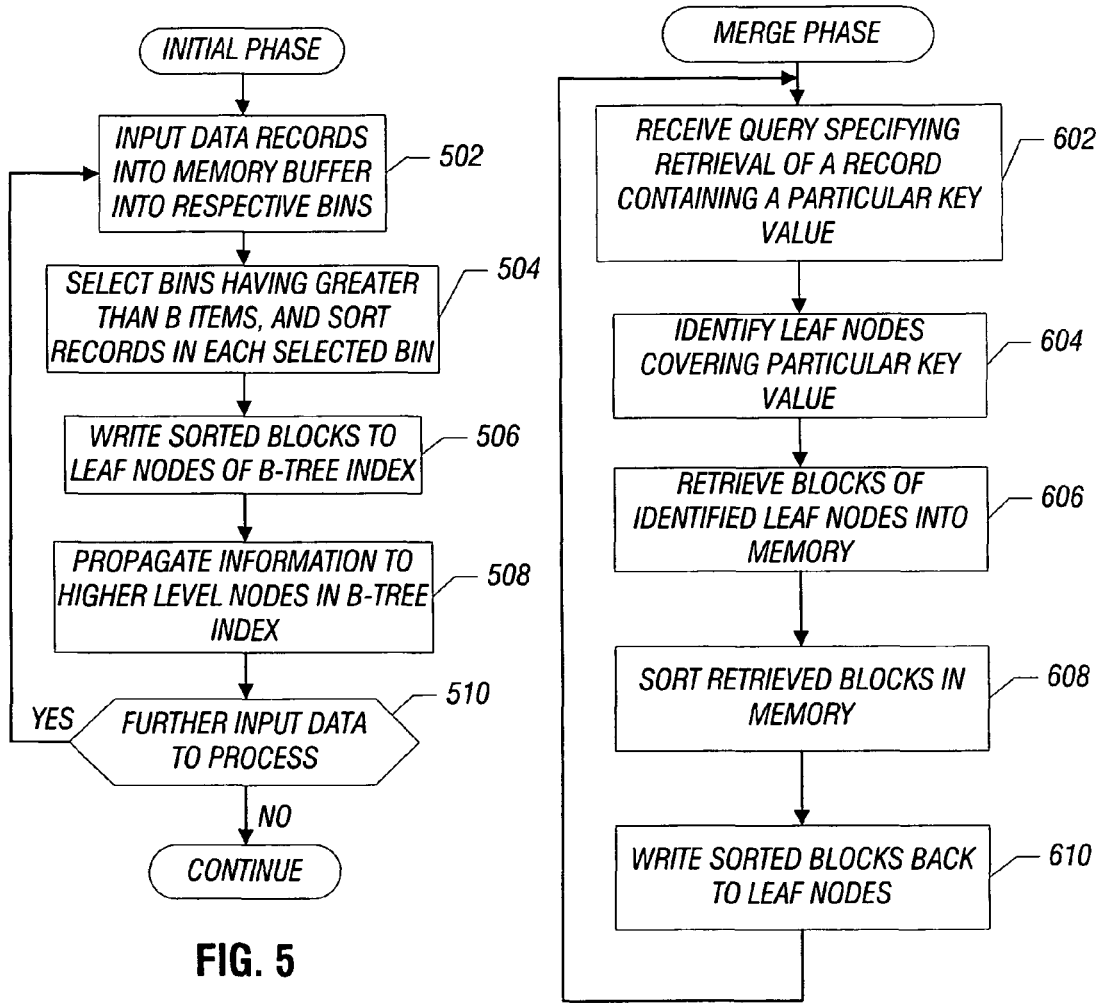
FIG. 5 is a flow diagram of an initial phase of a process of building an index in accordance with an embodiment.
FIG. 6 is a flow diagram of a merge phase of a process of building an index in accordance with an embodiment.

As shown in FIG. 5 (which can be performed by the filter 134 of FIG. 1), an input stream of data records are read (at 502) into the K bins 206 in the memory buffer 204 until no further records can be read into the memory buffer 204. Due to randomness, some bins may have more items and some may have fewer items or even be empty. All or some of the bins that have more than B records are selected (at 504) for sorting. The records in the selected bin are sorted into non-overlapping blocks. The blocks produced from sorting records within a bin are non-overlapping because the records in the bin can be fully sorted, such that the blocks produced from the selected bin are also sorted with respect to each other (non-overlapping). Next all sorted blocks in the selected bin are written (at 506) to the storage 106 (into corresponding leaf nodes of an ss-B-tree index 114). If a bin contains more than q*B but fewer than (q+1)*B items, q non-overlapping blocks will be written out to q corresponding leaf nodes in the ss-B-tree index. By the choice of K, at least one bin will have more than B items. Once the blocks are written to persistent storage 106, the memory buffer 204 portion previously occupied by the written blocks is freed for receiving more items (in other words, the memory is recycled).

There are various techniques of writing sorted blocks to the ss-B-tree index. In the approach discussed above, the bin with the largest number of records is sorted and as many blocks as possible are written out from that bin before refilling the buffer. In another approach, only one block at a time is written and the buffer is refilled with input data before the next block is written. The latter approach produces tighter blocks, but involves a larger amount of computation due to repeated sorting of some of the items.

With the techniques discussed above, the thickness at any key is guaranteed to be less than N/M. Assuming the input sequence is made up of independently and identically distributed (IID) data, it is expected that the thickness will be half the N/M value. Few data sequences are likely to be independently and identically distributed, as nearby quantities are likely to be related (one value influences the next value), an effect referred to as temporal correlation because the sequence is usually indexed by time. When temporal correlation exists in data, the expected thickness tends to be even smaller. Thus, in accordance with some embodiments, for most input data sequences, the thickness at key values for the ss-B-tree index is likely to be relatively small compared with N/M.

Figure 4:
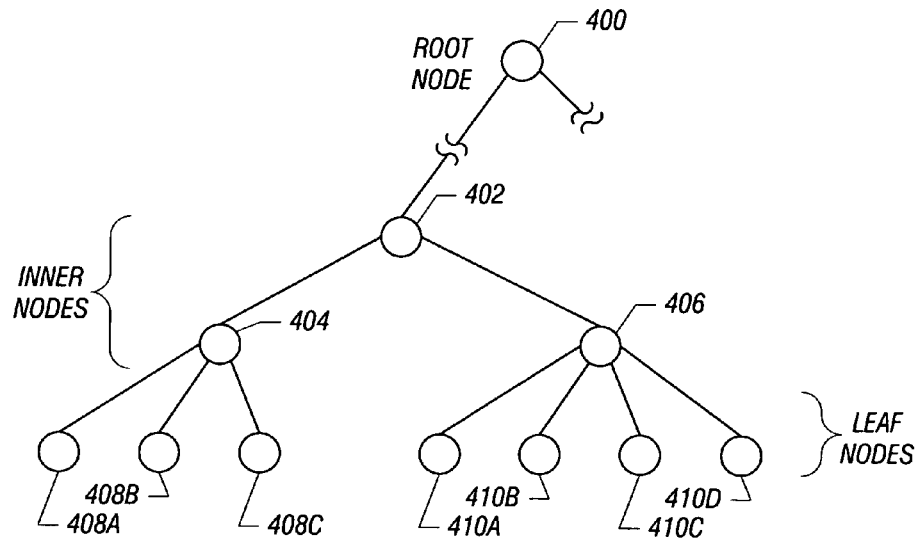
FIG. 4 is a graph illustrating a B-tree index according to an example embodiment.

As noted above, writing blocks to the ss-B-tree index means that the blocks are written to respective leaf nodes of the ss-B-tree index, as depicted in FIG. 4. Each leaf node represents a corresponding block. As noted above, a block $b_i$ contains a number (B) of key value and reference, $(k_{i_1}, r_{i_1})$, $(k_{i_2}, r_{i_2}), \ldots (k_{i_B}, r_{i_B})$, items, and a key range represented by the minimum and maximum key values in the block. For each block of (sorted) keys written to the persistent storage 106, the range of the block and the location of the block are provided as input to an ss-B-tree node (inner node) one level above. This can be a hierarchical process and all levels of the inner nodes can be processed in parallel. A block written out at level I produces an input item at level I–1 (where level 0 is the highest level corresponding to the level of the root node).

Each of the inner nodes of the ss-B-tree index does not actually contain data in the blocks; rather, the inner nodes contain information relating to nodes one level below the particular inner node. For example, as depicted in FIG. 4, inner node 404 contains information pertaining to the three leaf nodes 408A, 408B, 408C below the inner node 404. Thus, the inner node 404 contains the following information: (1) key range for the block corresponding to leaf node 408A, and the location of the block corresponding to leaf node 408A; (2) key range and location for the block corresponding to leaf node 408B; and (3) the key range and the location of the block corresponding to leaf node 408C.

The inner node 406 similarly contains information associated with leaf nodes 410A, 410B, 410C, 410D. The inner node 402 one level above inner nodes 404, 406 similarly contains information pertaining to inner nodes 404, 406. For the inner nodes, each item contains both the start and end of a range, and a location of a child node (e.g., left_boundary, right_boundary, location of the child).

Thus, in response to a block written to a leaf node, the information of the inner node above the leaf node is updated. In response to the information of the inner node being updated, the inner node above the updated inner node is further updated. Thus, as depicted in FIG. 5, the changes are propagated (at 508) up the hierarchy until the information in the root node has been updated.

The index builder next determines (at 510) whether there is further input data to process (whether there is further data input in the source storage 200 or further data records remaining in the memory buffer 204). If so, the process at 502-510 is repeated.

The records in the leaf nodes and the records in the inner nodes may not have the same size. Therefore the block sizes may be different. $B_{leaf}$ is the block size for leaf nodes and $B_{inner}$ is the block size for inner nodes (and the root node).

Since there is no overlapping at the boundaries of the bins, these boundaries can be matched with the block boundaries at a certain level of the ss-B-tree index. At that level and above, there will be no overlapping ranges in the ss-B-tree index. This certain level can be readily calculated. The expected thickness at the leaf level is bound by a power of the block size of the inner node, $$E(\text{thickness}) \le N/M < B_{inner}^{p} \text{ and}$$

$$B_{inner}^{p-1} < N/M$$

The range boundaries of inner nodes at a certain level that is p levels above the leaf level can be matched with the boundaries of the bins, such that no overlapping of ranges occurs at this certain level.

In one example, based on 4 GB size for the memory buffer, 1 KB record size, and N=400,000,000, the following is derived: M=4,000,000, N/M=100. For a relatively wide range of $B_{inner} \in [10,99]$ (the number of records in each inner node is between 10 and 99), only the level immediately above the leaf level may have overlapping ranges. For $B_{inner} > N/M$, overlapping ranges in the inner nodes can be avoided altogether, with overlapping occurring only at the leaf nodes in this latter scenario.

This example shows that there is a lot of flexibility to design an ss-B-tree index with no overlapping ranges in the inner nodes. As discussed above, the expected thickness can be much smaller than N/M when there is a temporal correlation in the input data stream.

In the inner nodes, range information can be stored in compressed form. One example of compression is to store increment (or delta) values rather than the range information. In other words, instead of storing a minimum key value and a maximum key value to represent a range, an increment (or delta) value representing the difference between the minimum and maximum value can be stored instead. The difference value is a smaller number than the minimum and maximum value, so that the number of bits involved in storing the difference value is smaller. The increment (or delta) value can be referenced to some root value further up the hierarchy.

For a portion of an ss-B-tree index that has no overlapping ranges between any two inner nodes, one option to improve performance is to store all the (key range, location) pairs from the leaf nodes into a file (or a sequence of sorted pairs in memory). After all the (key range, location) pairs have been retrieved into memory, a second pass through the pairs is performed to produce a fully sorted inner nodes in the ss-B-tree index. If the value of B for each leaf node is $\ge 100$ (meaning that each block has 100 or more records), the total size of the inner nodes is usually a small percentage (1%-2%) of the total storage for the leaf nodes. The second pass through the data of the inner nodes thus would not substantially contribute to I/O overhead.

The above process of FIG. 5 describes the initial phase of building an ss-B-tree index. FIG. 6 shows the merge phase that occurs during actual database operation, after the ss-B-tree index has been built. The database software receives (at 602) a query that specifies retrieval of a record containing a particular key value. Note that a query usually specifies retrieval of multiple records that may contain multiple key values. However, for the sake of simplicity, it is assumed that the query specifies just one key value. In the case where multiple key values are specified, the process of FIG. 6 is just repeated for each of the other key values.

In response to the received query, the index builder 132 identifies (at 604) leaf nodes that cover the particular key value. If there are overlapping blocks that cover the particular key value, then two or more corresponding leaf nodes will be identified. The blocks of the identified leaf nodes are retrieved (at 606) into memory, where the retrieved blocks are sorted (at 608) in memory. The sorted records in the memory will then be used to form new blocks that do not overlap.

The sorted blocks are then written back (at 610) to corresponding leaf nodes in the ss-B-tree index. The process at 602-610 is repeated for all other received queries during database operation. The incremental update of different portions of the ss-B-tree index during database operation allows for a more distributed manner of building a sorted B-tree index without causing the B-tree index to be unavailable for extended periods of time.

In addition to incremental sorting of accessed blocks of the ss-B-tree index in response to demand, a background process can also be provided. This background process is run as a low-priority process to perform a merge-sort operation, where overlapping blocks are identified, with the identified overlapping blocks retrieved into memory for merging and sorting. The result includes non-overlapping blocks that are written back to the ss-B-tree index. The background process performs the merge-sort when database system resources are available and when the affected blocks of the ss-B-tree index are not in use.

The following compares database system performance during a search under different scenarios: a first scenario where the ss-B-tree index is fully sorted (or a B-tree index); a second scenario where the B-tree index is partially sorted; and a third scenario where no index is used (so that a full table scan has to be performed each time).

Fully sorted: $O(\log(N))$

Semi-sorted: $O(\log(N)+\text{thickness})$, no overlapping inner nodes

Not sorted: $O(N)$

For a fully-sorted B-tree index, finding a particular key value can be performed in $O(\log(N))$ time, in other words, in time proportional to $\log(N)$, where N is the number of records in the base table. When the ss-B-tree index is used instead, the time involved in finding a record having a particular key value is on the order of $\log(N)+\text{thickness}$. As discussed above, the thickness is less than N/M (and much less than N/M if temporal correlation exists in the input data sequence, which is usually the case). Reducing thickness in the ss-B-tree index would result in better performance. In the scenario where no B-tree (or no ss-B-tree) index is used, the time involved in finding a record containing a particular key value is on the order of N, which indicates that a full scan of the entire base table is performed.

The operations performed on the ss-B-tree index according to some embodiments are similar to fully-sorted B-tree operations with minor adjustments to handle overlapping nodes. The operations below assume that the inner nodes are non-overlapping. A merge operation refers to merging of leaf nodes of the ss-B-tree index, which can occur when records are deleted so that there are fewer records in the leaf nodes. The merge operation for an ss-B-tree index does not differ from a fully-sorted B-tree index.

Another operation that can be applied to the ss-B-tree index is a split operation, in which a leaf node or an inner node can be split. Splitting a leaf node does not involve any special handling (when compared to splitting a leaf node of a fully-sorted B-tree index) since the key values in each leaf node are already sorted. Splitting of a leaf node into two leaf nodes will readily produce two leaf nodes, each containing sorted records. However, splitting the lowest level inner node (which is the level right above the leaf node level) involves some special handling. The overlapping leaf nodes that cover the new splitting boundary have to be sorted to reduce the thickness at the new boundary to 1. If the split cascades to higher-level indexing nodes that do not have overlapping ranges, the split operation becomes identical to the split of conventional B-tree indices.

A merge-sort operation can be run as a background process (as discussed above) as a low-priority process that is independent of user queries. A merge-sort operation reads overlapping leaf nodes and sorts the records in memory and writes them out. After the merge-sort operation, the thickness of any key value x in this range becomes 1. Since the merge-sort operations are carried out on a small amount of data at a time, the affected ss-B-tree nodes are locked for a relatively short period of time.

A find x operation finds all leaf nodes that cover a key value x. Once the leaf nodes are found, then a search is performed in these leaf nodes to find the record that contains the actual key value.

An insert x operation inserts a record into one of the leaf nodes that covers x. In accordance with some implementations, when inserting a record containing the key value x, the record is inserted into a leaf node where the key value x is not a boundary value of the leaf node. If an insertion of a record into a leaf page causes a split, then the split operation discussed above is carried out.

A delete x operation checks all leaf pages that cover x and deletes the record that contains the key value x. Note that all leaf nodes containing the key value x are hung under the same inner node since the inner nodes do not have overlapping ranges. Deleting a record may trigger a merge.

Instructions of software described above (including the database software 102, the index builder 132, filter 134 of FIG. 1) are loaded for execution on a processor (such as one or more CPUs 104 in FIG. 1). The processor includes microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed or removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method executed in a database system of providing an index for a table, comprising:
   in an initial phase of building the index, partially sorting, by a processor, the index to form a semi-sorted B-tree index, wherein the semi-sorted B-tree index is separate from the table, wherein the semi-sorted B-tree index contains an arrangement of data values of a key and associated locations in the table, wherein the key includes one or more attributes of the table, and wherein the semi-sorted B-tree index contains data values of the key that are out of order with respect to each other, the semi-sorted B-tree index having leaf nodes containing corresponding portions of the semi-sorted B-tree index, wherein at least some of the portions corresponding to the leaf nodes have key ranges that overlap; and
   subsequently, in response to accessing portions of the semi-sorted B-tree index to process a first database query that specifies an operation on the table, further sorting, by the processor, the accessed portions of the semi-sorted B-tree index.

2. The method of claim 1, wherein the accessed portions are retrieved from corresponding leaf nodes of the semi-sorted B-tree index.

3. The method of claim 1, wherein forming the semi-sorted B-tree index comprises forming the semi-sorted B-tree index having inner nodes that have key ranges that do not overlap.

4. The method of claim 1, wherein forming the semi-sorted B-tree index comprises forming the semi-sorted B-tree index having inner nodes that have key ranges that overlap.

5. The method of claim 1, further comprising:
   in response to accessing other portions of the semi-sorted B-tree index to process a second database query that specifies an operation on the table, further sorting the other portions of the semi-sorted B-tree index.

6. The method of claim 5, wherein the database system comprises a parallel database system having multiple modules comprising a first module and a second module, and wherein further sorting the accessed portions for the first database query is performed by the first module concurrently with further sorting the accessed portions for the second database query performed by the second module.

7. The method of claim 1, wherein the first database query specifies access of a record containing a particular data value of the key, and
   wherein the accessed portions are overlapping portions each containing a corresponding key range that covers the particular data value of the key.

8. The method of claim 1, further comprising:
   retrieving the accessed portions into memory from a persistent storage that stores the semi-sorted B-tree index, wherein further sorting the accessed portions is performed in the memory; and
   writing the sorted accessed portions back to the semi-sorted B-tree index in the persistent storage.

9. The method of claim 1, further comprising:
   inputting records of input data into plural bins of a memory buffer;
   iteratively selecting from among the plural bins in which to perform sorting; and
   after sorting, writing sorted portions from each selected bin to the index.

10. The method of claim 9, further comprising defining endpoints of the plural bins based on a distribution of data values of the key.

11. The method of claim 10, further comprising determining the distribution of key values based on a sampling of a subset of the records of the input data.

12. The method of claim 1, wherein the initial phase of building the index is based on a single pass through records of input data, wherein the records of the input data are for storing in the table.

13. A method of providing an index for a table, comprising:
inputting records of the table;
producing, by a processor, sorted portions of the records based on the input records;
in an initial phase of building the index, writing, by the processor, the sorted portions to the index, wherein at least some of the portions have ranges of a key that overlap such that a semi-sorted B-tree index is provided, the semi-sorted B-tree index containing data values of the key that are out of order with respect to each other and having leaf nodes containing corresponding portions of the semi-sorted B-tree index, where at least some of the leaf nodes contain corresponding ones of the at least some portions having ranges of the key that overlap, wherein the semi-sorted B-tree index is separate from the table, wherein the semi-sorted B-tree index contains an arrangement of data values of the key and associated locations in the table, and wherein the key includes one or more attributes of the table; and
incrementally sorting the at least some portions in processing database queries involving the semi-sorted B-tree index to further sort the semi-sorted B-tree index.

14. The method of claim 13, wherein writing the sorted portions to the index comprises writing the sorted portions to corresponding leaf nodes of the semi-sorted B-tree index.

15. The method of claim 13, further comprising:
defining bins in a memory buffer, wherein inputting the records of the table comprises inputting the records of the table into the bins;
iteratively selecting bins in which to perform sorting of records to produce the sorted portions,
wherein defining the bins is based on at least one of (1) distribution of data values of the key in the input records; and (2) a query access pattern.

16. A computer-readable storage medium storing instructions that when executed cause a processor in a database system to:
in an initial phase of building an index for a table, partially sort the index to form a semi-sorted B-tree index, wherein the semi-sorted B-tree index is separate from the table, wherein the semi-sorted B-tree index contains an arrangement of data values of a key and associated locations in the table, wherein the key includes one or more attributes of the table, and wherein the semi-sorted B-tree index contains data values of the key that are out of order with respect to each other, the semi-sorted B-tree index having leaf nodes containing corresponding portions of the semi-sorted B-tree index, wherein at least some of the portions corresponding to the leaf nodes have key ranges that overlap; and
subsequently, in response to accessing portions of the semi-sorted B-tree index to process a database query that specifies an operation on the table, further sort the accessed portions of the semi-sorted B-tree index.

17. The computer-readable storage medium of claim 16, wherein the semi-sorted B-tree index further has inner nodes, and wherein the inner nodes store ranges of the key in compressed format.

18. The computer-readable storage medium of claim 16, wherein the database query specifies access of a record containing a particular data value of the key, and
wherein the accessed portions are overlapping portions each containing a corresponding key range that covers the particular data value of the key.

* * * * *